Feb. 12, 1952  R. B. HARTMAN  2,585,121
ELECTRICAL CONDUCTIVITY TESTING APPARATUS
Filed May 29, 1950  3 Sheets-Sheet 1
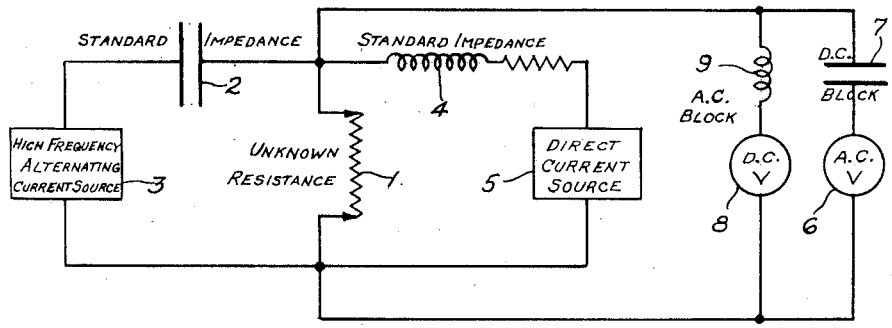
Fig. 1
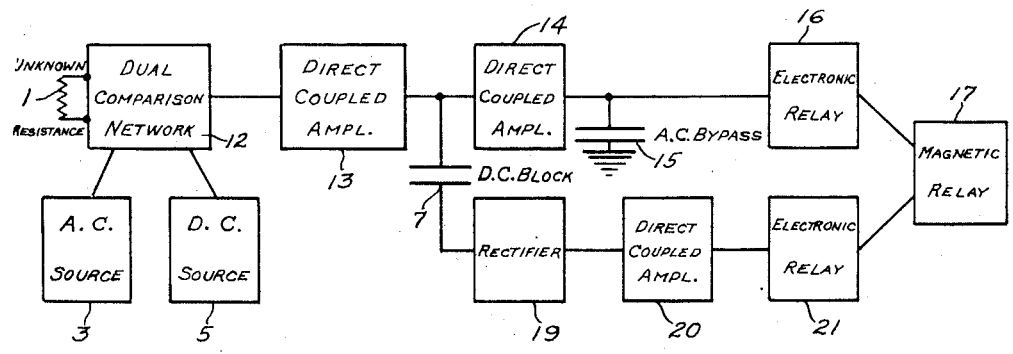
Fig. 3
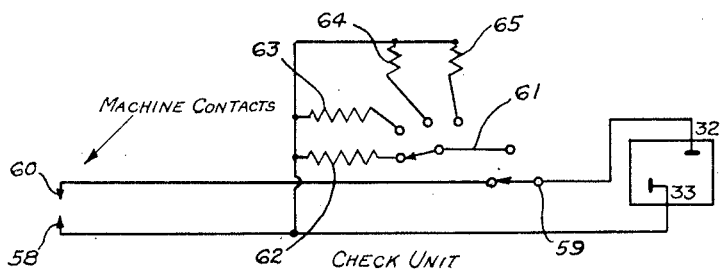
Fig. 5
INVENTOR.
ROBERT B. HARTMAN
BY
ATTORNEYS Feb. 12, 1952             R. B. HARTMAN             2,585,121

ELECTRICAL CONDUCTIVITY TESTING APPARATUS

Filed May 29, 1950                            3 Sheets-Sheet 2

INVENTOR.
ROBERT B. HARTMAN
BY
ATTORNEYS

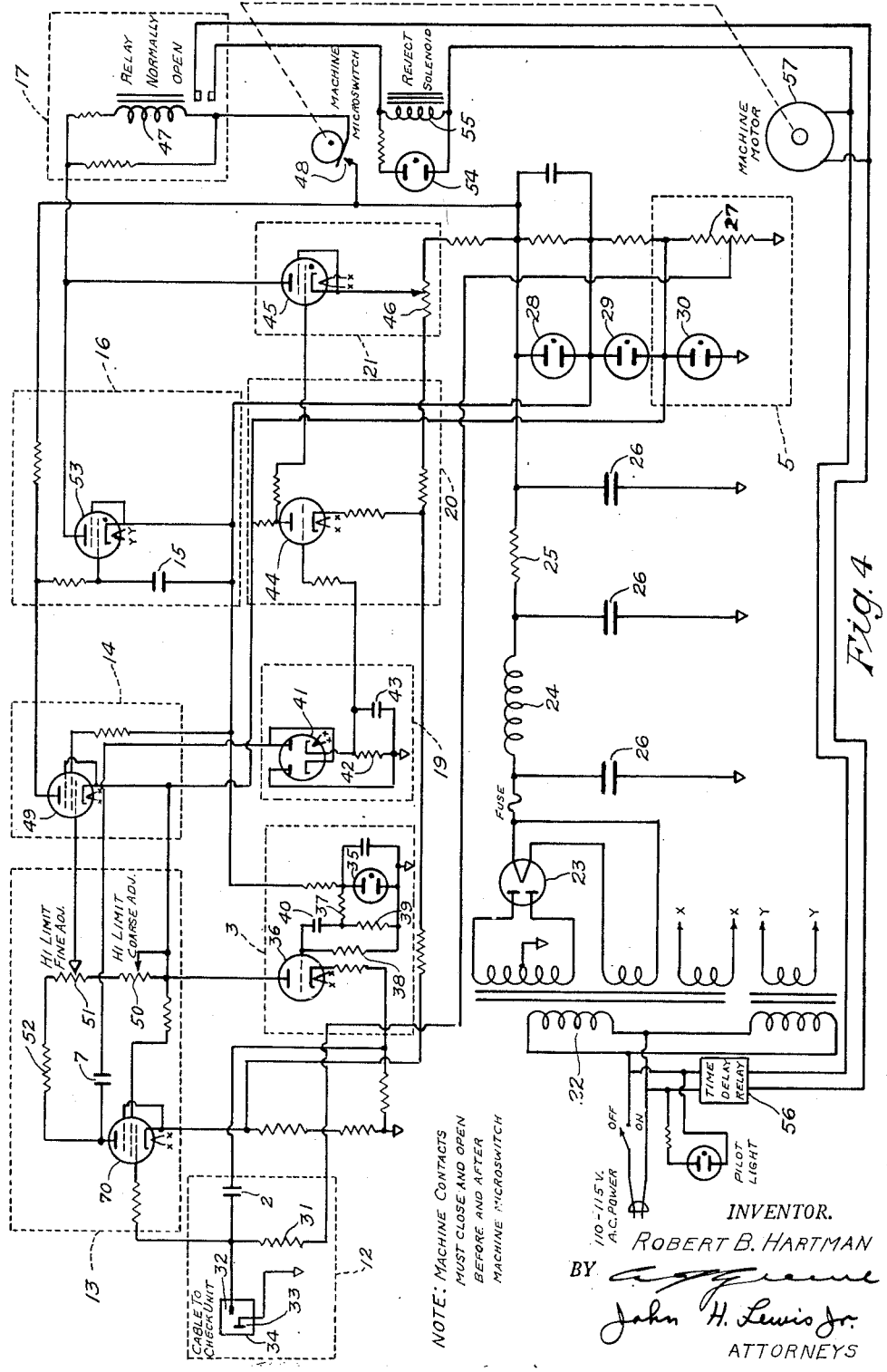

Patented Feb. 12, 1952

2,585,121

UNITED STATES PATENT OFFICE 2,585,121

ELECTRICAL CONDUCTIVITY TESTING APPARATUS

Robert B. Hartman, Fairfield, Conn., assignor to Remington Arms Company, Inc., Bridgeport, Conn., a corporation of Delaware Application May 29, 1950, Serial No. 164,959

12 Claims. (Cl. 175—183)

This invention relates to apparatus for testing the electrical resistance or conductivity of an article and is particularly applicable to the problem of selecting from production lots those articles having an electrical resistance between predetermined limits.

This invention is designed to be utilized with an automatic machine similar to that described in Patent No. 2,430,080, issued November 4, 1947, to Warren S. Reynolds. In such a machine this invention functions in place of the electrical circuit elements shown in Patent No. 2,432,390, issued December 9, 1947, to Paul F. Darby, or those shown in Patent No. 2,451,613, issued October 19, 1948, to Paul F. Darby and Lloyd A. Nevala. Like the circuit shown in Patent No. 2,432,390, it is especially useful in the production testing of electrical ammunition primers of the "wireless" type, or those in which the internal resistance of the priming composition per se is utilized to heat the composition to the ignition point in response to the flow of current therethrough.

As pointed out in the patents, above referred to, an electric primer is a dangerously explosive item designed to fire in response to the application of an electrical potential to its terminals. Obviously, it is necessary to pass an electrical current through the primer in order to measure its resistance. The character of the primer necessitates careful control over the magnitude of the current to insure that the primer is not inadvertently fired in testing. Further, and particularly with the "wireless" type of primer, the low and high limits of resistance for acceptable primers are quite widely spaced, primers having resistances between 2,000 ohms and 1 megohm having been found satisfactory in some applications, and production limits are generally set at 2,000 ohms and 300,000 ohms. Notwithstanding the width of these limits, however, it is desirable to be able to make a sharp discrimination between those primers which are within and those which are without the limits.

Accordingly, the principal object of my invention is the production of an electronic unit which will provide a very sharp indication at either extreme of the acceptable range.

A further object is the provision of an electronic unit which operates independently but simultaneously at both limits and one in which the measurement at each limit is carried out in the most sensitive portion of the circuit characteristic.

I contemplate that these and other objectives may be most readily achieved by utilizing the unknown resistor as an element common to two circuits. In one of these circuits an alternating current circulates through a standard impedance and the unknown resistor while means are provided to measure the alternating current voltage drop across the unknown resistance. Simultaneously, a direct current also circulates through another standard impedance and the unknown resistor while means are provided to measure the direct current voltage drop across the unknown resistance. By suitable choice of circuit elements the direct current measurements may be isolated from the alternating current measurements and vice versa. When the standard impedance in the alternating current loop has an impedance at the particular frequency which is substantially equal to the desired low resistance limit, the alternating current measuring means will give its most sensitive indication in the region of the low resistance limit. Similarly, when the resistance of the standard impedance in the direct current loop is substantially equal to the desired high resistance limit, the direct current measuring means will give its most sensitive indication in the region of the high resistance limit. Thus, the acceptable unknown resistors will be those which give an alternating current measurement greater than a predetermined minimum and a direct current measurement less than a predetermined maximum. Since the measurements are completely independent each limit can be examined with the same degree of sensitivity and accuracy, and the selection of the most sensitive ranges may be readily made by the choice of suitable values of standard impedances.

The exact nature of the invention as well as other objects and advantages thereof will become more clearly apparent from a consideration of the following specification referring to the attached drawings in which:

Fig. 1 is a simplified diagram of the comparison network.

Fig. 2 is a graph on which voltage drops across the unknown resistor, expressed as a percentage of the source voltage, are plotted against the resistance values of the unknown resistor. The dotted line curve is that obtained by alternating current measurements. The resistance scale is logarithmic.

Fig. 3 is a simplified block wiring diagram of the complete circuit.

Fig. 4 is a detailed schematic diagram of the complete circuit. The dotted lines enclosing various sections of the diagram set off the units corresponding to the blocks in Fig. 3.

Fig. 5 is a schematic diagram of a check unit for testing the accuracy of the adjustment of the limits.

Figure 2:
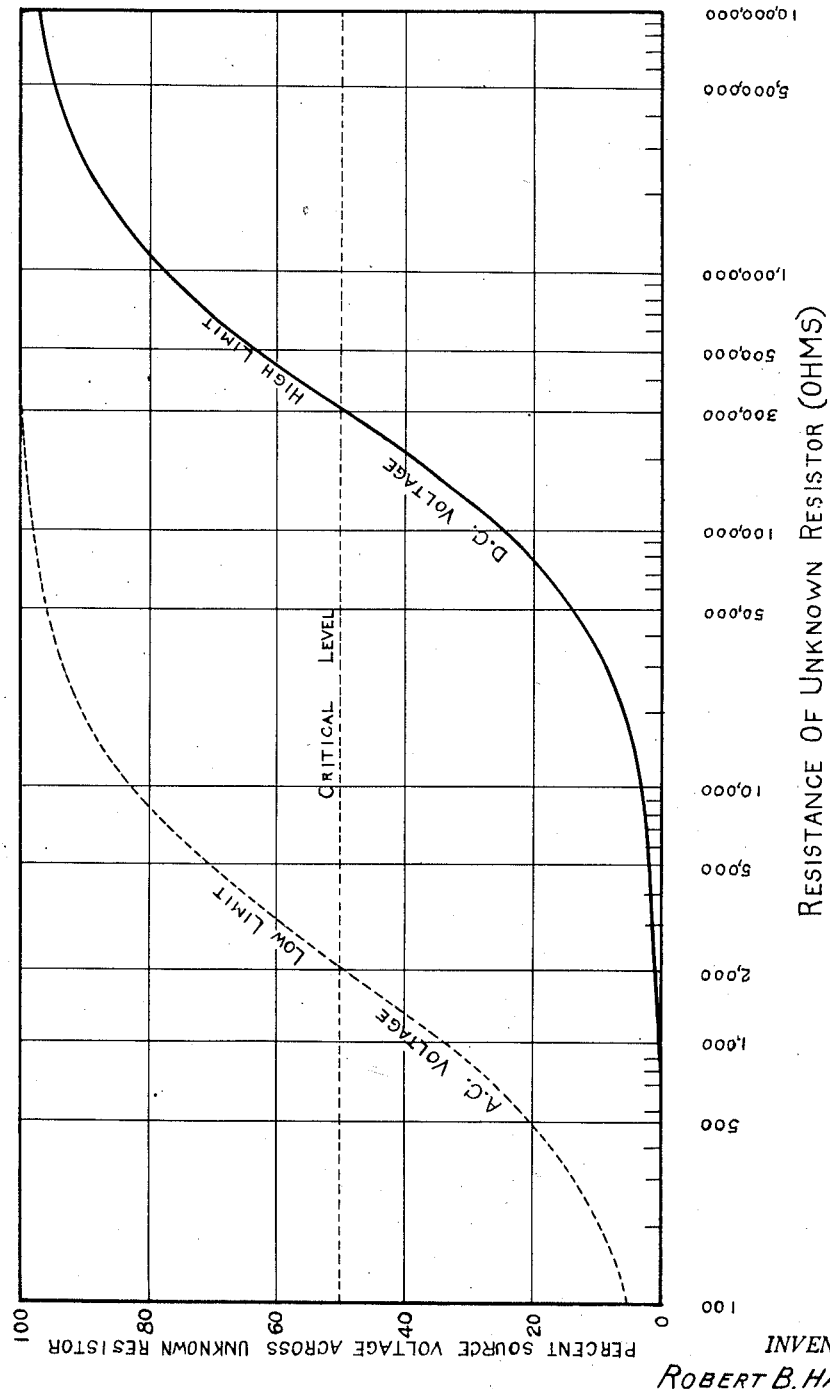

Referring to the drawings by characters of reference, it will be seen that Fig. 1 comprises the unknown resistor 1 which is inserted into an alternating current circuit including a standard impedance 2, which may be a capacitor and a source of alternating current 3. At the same time, the unknown resistor 1 is also included in a direct current circuit including a standard impedance 4, which may be an inductance of known resistance, and a source of direct current 5. A stable gas tube oscillator operating at a frequency of about 3000 cycles per second has been found to be a satisfactory source of alternating current and the voltage derived therefrom should not exceed about one volt. The direct current voltage source may be either a battery or a voltage divider across a rectifier-filter power supply preferably with a stable controlled voltage of one volt or less. For maximum sensitivity, the capacitor 2 should have an impedance measured in ohms at oscillator frequency substantially equal to the desired low resistance limit for the unknown resistor. Obviously, the capacitor will block the flow of direct current and only alternating current will flow in this circuit.

Similarly, the direct current resistance of the inductance should, for maximum sensitivity, be substantially equal to the desired high resistance limit for the unknown resistor and, unless that limit is very high, should have sufficient inductance to substantially block the flow of alternating current in this portion of the circuit. Obviously, in case the low resistance limit is fairly low and the high resistance limit fairly high, e. g., respectively, about 2,000 ohms and several hundred thousand ohms, it may not be necessary to use an inductance as the standard impedance in the direct current loop, for the resistance of a noninductive standard 4 at which maximum sensitivity will be obtained will be so high as to present a negligible shunt path for alternating current.

Obviously, there will be a voltage drop across the unknown resistor as the result of the flow of current therethrough and the alternating current drop may be measured with any convenient form of alternating current instrument 6 which should be isolated from direct current potentials with a blocking capacitor 7. Similarly, the direct current drop may be measured with any suitable direct current instrument 8 which may be isolated from alternating current by a choke inductance 9. The full scale reading of either instrument should be not less than the voltage of the respective sources, for this full voltage will appear at the unknown resistor terminals in case the unknown resistor should be open circuited.

Fig. 2 is a plot of unknown resistor voltage drops expressed as a percentage of source voltage in a circuit set up for a low limit of about two thousand ohms and a high limit of about three hundred thousand ohms. It will be noted that the dotted line curve of alternating current voltage is steepest or has the greatest change in voltage per logarithmic increment of resistance change in the region centered on the low resistance limit, while a similar condition exists with respect to the direct current voltage at the high resistance limit. Further, since a substantial portion of each curve, centering on the design optimum, bears a practically direct relationship to the logarithm of the resistance, it may be seen that considerable latitude exists for adjusting actual limits without requiring the substitution of other values for the standard impedances. If desired, both of the measuring instruments may be calibrated directly in ohms with the understanding that measurements above about 80% of supply voltage and below about 20% of supply voltage of either alternating or direct current are outside the range of direct relationship and probably should be ignored. To select an unknown component within the desired range, it is only necessary to ascertain that the alternating current measurement exceeds the designed minimum, one-half supply voltage being optimum, and that the direct current measurement is less than the designed maximum, one-half supply voltage being optimum for the direct current measurement also.

For a production operation it would obviously be desirable to eliminate any dependence upon visual observation of measuring instruments and to substitute instead electronic means which can automatically give an indication and/or initiate the action of reject means such as that shown in the Reynolds patent above referred to. In block diagram form, Fig. 3 illustrates the essentials of such a system, the blocks indicated as "A. C. source" 3, "D. C. source" 5, and "Dual comparison network" 12, correspond to all of Fig. 1 except the two measuring meters with their associated blocking elements. Since both alternating and direct current voltages are to be measured and, for safety reasons, the actual voltages may be only fractions of a volt, it is desirable to incorporate at least one stage of direct coupled vacuum tube amplification corresponding to vacuum tube voltmeter practice to secure voltage changes of a magnitude sufficient to operate the associated equipment to be described. Such an amplifier is represented in the first block marked "Direct coupled amplifier" 13 and serves to provide voltage amplification of both alternating and direct voltage components of the voltage drop across the unknown resistance.

Both components of voltage may be further amplified in the second direct coupled amplifier 14 and the alternating current component of the output of this amplifier may be by-passed to ground through a capacitor 15 having a negligible impedance to ground relative to the alternating current frequency employed and a practically infinite impedance to ground relative to direct current. The thus isolated direct current component may be utilized as the control voltage for an electronic relay 16, of either gaseous or vacuum tube type, which shares in the control of the operation of a sensitive magnetic relay 17. Obviously, the gain or grid bias controls of one or more of these units should be arranged to cause the operation of the magnetic relay whenever the direct current voltage across the unknown resistance exceeds a value corresponding to the desired high resistance limit. The magnetic relay 17 may be utilized to initiate the action of an audible or visible signal, to control the action of an automatic reject mechanism or both in accordance with well understood practice, and is particularly useful when used to set reject pins of a machine corresponding generally to that of the Reynolds patent previously cited herein.

The alternating current component is preferably isolated by carrying it through the direct current blocking capacitor 7, which should present a practically infinite impedance to direct current and a negligible impedance to alternating current of the frequency of the alternating current source 3. The alternating current voltage component may next be applied to a rectifier or detector 19 which derives from it a direct current voltage proportional to the magnitude of the alternating current component. The output of the rectifier 19 may then be amplified in the direct coupled amplifier 20 and applied to the control of an electronic relay 21 which is arranged to share in exerting a control action on the magnetic relay 17. This circuit should obviously be so arranged as to initiate the action of the magnetic relay 17 whenever the alternating current voltage across the unknown resistor fails to exceed a value corresponding to the desired low resistance limit. It should perhaps be mentioned at this point that the simplest way of securing joint control over the magnetic relay 17 by the two electronic relays 16 and 21 is to place the solenoid coil of the relay 17 in series with the supply of voltage to the parallel connected plate circuits of the two electronic relays and to arrange those electronic relays so that one or the other will pass a materially increased current in response to an unsatisfactory resistance condition at either limit. Obviously, a sharp increase in the flow of current through either electronic relay will then serve to pull in the magnetic relay 17 and initiate the actions dependent thereon.

Referring now to Fig. 4, it may be seen that the portion of the circuit including transformer 22, rectifier 23, filter choke 24, current limiting resistor 25, and filter capacitors 26, constitutes a substantially conventional plate voltage supply which is regulated as to output voltage by the gas tube regulators 28, 29, and 30. A voltage divider 27 across the regulator 30 provides a constant direct current voltage which serves as the direct current source 5 of either Figs. 1 or 3. Current from this voltage source passes through the standard impedance which is the fixed resistor 31 and then to the unknown resistor which is effectively connected across terminals 32 and 33 of the terminal block 34, terminal 33 being grounded to complete a return path to the grounded end of the voltage divider 27.

The gaseous diode 35 serves as a simple sawtooth oscillator of known type and has been very satisfactorily used at frequencies on the order of 3000 cycles per second. The output of this oscillator is coupled through triode 36 operating as a cathode follower to the standard impedance 2 and through the unknown resistance back to the common ground. The coupling network consisting of resistances 37, 38, and 39 and capacitor 40 is designed to minimize loading of the oscillator. The cathode follower 36 serves the dual purpose of isolating the oscillator and providing a constant voltage source for the unknown resistance measurement. The standard impedance 2 also operates as a direct current block to isolate the unknown resistor from direct current voltages in the cathode follower circuit.

The portions of the circuit thus far described correspond to the units of boxes 3, 5, and 12 of the simplified block diagram of Fig. 3. The alternating and direct current voltage drops to be measured appear between terminal 32 and the common ground of the whole system. Vacuum tube 70 may be of the pentode type and with its associated circuit operates as a high gain direct coupled amplifier 13 to amplify both direct and alternating components of the voltages appearing across the unknown resistance.

A direct current blocking capacitor 7 permits only the alternating current component of the output of amplifier 70 to pass to the duplex diode rectifier 41 which is so arranged that the negative half cycle of the wave is shorted to ground while the positive half cycle permits current to flow through resistance 42 across which a smoothing capacitor 43 is connected. During each negative half cycle the capacitor 7 is given an opportunity to discharge, preventing the accumulation of a charge which could block further operation of the circuit and lead to false rejections. The smoothing capacitor 43 and resistance 42 have a time constant which is long compared to the time interval between positive half cycles and short compared to the time interval consumed by each of the successive resistance measurements of unknown resistances. Hence, the potential at the cathode of the diode 41 during a measuring period stabilizes as substantially smooth direct current at an average level directly proportional to the peak-to-peak voltage of the alternating current voltage drop across the unknown resistance. Between measuring periods the unknown resistor may be out of the circuit and under those conditions the effect is that of infinite resistance in place of the unknown. During these inactive intervals the capacitor 43 will be charged to a maximum voltage which, within two or three half cycles of the connection of the unknown resistor, will stabilize at the average value proportional to the resistance.

The voltage on the capacitor 43 is applied to the control grid of the vacuum tube 44 in the direct coupled amplifier identified in Fig. 3 as 20. In the inactive periods or those in which the capacitor 43 is charged to its maximum voltage, the tube 44 conducts a maximum current and the plate of tube 44 will be many volts more negative than when the capacitor 43 is charged to a lesser value.

The negative swing of the plate of tube 44 under conditions of increasing resistance of the unknown is utilized to prevent the firing of thyratron tube 45 by direct connection to the grid of the thyratron. The grid bias on the thyratron and therefore the resistance value at which it will fire is easily regulated by adjusting its cathode potential with the potentiometer 46. This adjustment of bias should be made at such a value that it will require a negative swing of the plate of tube 44 corresponding to an alternating current resistance measurement equalling or exceeding the predetermined low resistance limit to keep the thyratron from firing. Plate potential for the thyratron is supplied through a circuit drawing at least part of its current through solenoid coil 47 of magnetic relay 17 but is interrupted during the intervals between inspections by the micro-switch 48 mounted on a machine similar to that described in the Reynolds patent above referred to. Preferably, this micro-switch should be timed to apply plate voltage to the thyratron shortly after the connection to the unknown resistance has been established and to interrupt the supply of plate voltage to the thyratron shortly before the connection to the unknown resistance is broken. In that way, transients in the electronic circuit arising from the insertion or removal of the unknown resistance will not cause false operations of the relay 17. Obviously, the opening of the micro-switch 48 will extinguish the thyratron if it is fired in the inspection operation and reset it for a successive operation.

As previously noted, the tube 70 serves to amplify both alternating and direct current components of the voltage drop across the unknown resistance. These voltages are again amplified in another direct coupled amplifier indicated as 14 in Fig. 3 which may employ the pentode tube 49. It will be noted that the cathode of tube 49 is connected to the direct current supply at a point controlled by regulator 30 and that in series relation between this cathode and the plate of tube 70 are the two potentiometers 50 and 51 and the load resistance 52. The potentiometers 50 and 51 serve respectively as coarse and fine controls of the grid bias on tube 49 and of the percentage of the output of tube 70 which is applied to the grid of tube 49. For delicacy of adjustment one of the potentiometers 50 and 51 should have a maximum resistance five or more times that of the other potentiometer. The adjustment of these controls, as will more fully appear later, sets the upper resistance limit at which the circuit will indicate an unsuitable value of the unknown resistance.

The output of tube 49 is coupled directly to the control grid of thyratron tube 53, at which point the alternating current component is bypassed to ground through the capacitor 15. By examining the phase relationships in the successive amplifier stages it will be seen that as the voltage of the unknown resistor increases from zero, the current through tube 70 increases and that through tube 49 decreases. The plate of tube 49, and the grid of thyratron 53 connected thereto, become more positive as the resistance of the unknown increases. The circuit components and the coarse and fine controls 50 and 51 are so chosen and adjusted that thyratron 53 will not fire until the unknown resistance has a value greater than the predetermined upper limit. This condition would obviously tend to cause the thyratron to fire whenever the unknown resistor was not in the circuit and for this reason as well as the stabilization previously mentioned, the plate voltage is removed from the thyratrons by action of the switch 48 until a firm connection has been established with the unknown resistor and the transients have settled out of the circuit. Obviously, the thyratron, if fired, will be extinguished by opening of the switch 48. As will be noted, the plate of thyratron 53 is connected to the plate of thyratron 45 and a substantial portion of the current to either one passes through the relay coil 47 to insure operation of the relay whenever either thyratron fires.

It is believed to be obvious that the combination of thyratrons and a relatively heavy duty relay can be replaced by the equivalent vacuum tube relay circuits drawing their plate currents through a sensitive relay.

The operation of the magnetic relay may be utilized to close a pair of normally open contacts which complete a circuit through a lamp 54 or audible indicators or through a solenoid 55 such as that shown in the Reynolds patent frequently referred to herein and arranged to cause the rejection of a defective component. As disclosed in the previous patents relative to the Reynolds machine and circuits therefor, it is essential to allow sufficient time for the electronic unit to warm up before the machine can become operative. Accordingly, a time delay relay 56 is provided which delays the application of power to the machine driving motor 57 and the reject solenoid 55 until a sufficient period of time has elapsed to insure that all elements of the electronic units are functioning. Generally, the maximum time delay may be considered to be fixed by the warm-up characteristics of the particular tubes employed, and may extend from several seconds to a number of minutes.

As previously stated, the unknown resistor is effectively connected across the terminals 32 and 33 of the terminal block 34. It is convenient and quite helpful in regular production use to interpose a check unit shown schematically in Fig. 5 between the terminals 32 and 33 and the unknown resistance. The check unit is arranged to plug in or otherwise connect to terminals 32 and 33 and carries grounded terminal 33 straight through to one of the machine contacts 58 which may engage the primer or other unknown resistance in the manner shown in Fig. 7 of Patent No. 2,451,613 previously referred to. The ungrounded terminal 32 is connected to the movable terminal of a single pole double throw switch 59. Preferably, this switch is of the spring return type having its normal position arranged to connect terminal 32 straight through to the other machine contact 60 for normal operation. In the second or check position of switch 59 the terminal 32 is connected to the movable terminal of a four position rotary switch 61. Check resistors 62, 63, 64, and 65 are connected from the rotary switch terminals back to the grounded terminal 33. Preferably, the check resistors will be chosen to represent the tolerance values of resistance at the high and low limits. For example, with electric primers when the nominal upper limit is about 300,000 ohms, check resistor 62 may be 400,000 ohms and check resistor 63 may be 250,000 ohms. Similarly, if the nominal lower limit is about 2,000 ohms, check resistor 64 may be 2,500 ohms and check resistor 65 may have a value of 1,500 ohms. In applications where closer tolerances are important, the appropriate values for the check resistors will be apparent. With switch 59 held in check position the machine may be turned over by its driving motor 57 or machine switch 48 may be operated manually. Adjustments of high limit potentiometers 50 and 51 should be made to cause an operation of the relay 17 for each actuation of the machine switch 48 while the check unit is connected to check resistor 62 and to not operate the relay 17 when connected to check resistor 63. Operation of the relay 17 and its controlled equipment is checked most readily by observation of the light 54 and of the operation of the reject solenoid 55. At the low limit, potentiometer 46 should be adjusted to actuate the relay 17 for each actuation of the machine switch 48 when check resistor 65 is in the circuit and not when check resistor 64 is in the circuit. Release of the spring return switch 59 permits it to return to its normal position for regular use. Since the machine and circuit may be so readily tested and adjusted, checks may be made at frequent intervals to insure that an inaccurate product is not passed.

In view of the discussion of the simplified block diagram which preceded the discussion of the detailed circuit, it does not appear that a review of the operation of the circuit is necessary.

It should be obvious that equivalents may be substituted for several of the units utilized in the detailed circuit. Accordingly, it is not intended that my invention be considered as limited to the exact circuit disclosed in Fig. 4. For the applicable limits upon my invention, reference may be made to the claims appearing below.

I claim:

1. Apparatus for testing an electrically conductive article comprising a first group of circuit elements defining an electrically continuous circuit including a source of alternating current, a standard impedance, and the electrically conductive article; a second group of circuit elements defining an electrically continuous circuit including a source of direct current, a standard impedance, and the electrically conductive article, said article forming an element common to and simultaneously included in both of said circuits; alternating current voltage measuring means provided with direct current isolating means connected across said article to measure the alternating current voltage drop therein; and direct current voltage measuring means provided with alternating current isolating means connected across said article to measure the direct current voltage drop therein, both of said measuring means being simultaneously connected to obtain independent, but simultaneous measurements.

2. Apparatus as described in claim 1, the standard impedance in said first group of circuit elements comprising a capacitor which has a very high direct current resistance, whereby said first group of circuit elements has a negligible shunting action on said second group of circuit elements.

3. Apparatus as described in claim 2, the standard impedance in said second group of circuit elements being one which has a very high alternating current impedance whereby said second group of circuit elements has a negligible shunting action on said first group of circuit elements.

4. Apparatus as described in claim 3, the alternating current impedance of the standard impedance in said first group of circuit elements being approximately equal to the lower value specified for the limits on the acceptable resistance of said electrically conductive article.

5. Apparatus as described in claim 4, the direct current resistance of the standard impedance in said second group of circuit elements being approximately equal to the higher value specified for the limits on the acceptable resistance of said electrically conductive article.

6. Apparatus as described in claim 5, said direct current isolating means including a direct current blocking capacitor having negligible impedance to alternating current of the frequency of the alternating current source in series relation with said alternating current measuring means.

7. Apparatus as described in claim 6, said alternating current isolating means including a grounded capacitor element for by-passing to ground the alternating current applied to the direct current measuring means.

8. Apparatus as described in claim 7, both of said measuring means comprising electron tube circuits and mechanical relay means, said tube circuits being constructed and arranged to operate said relay means in response to the testing of any electrically conductive article having a resistance outside said specified limits.

9. Apparatus as described in claim 8, said means for measuring alternating voltage drop including a rectifier arranged to pass a direct current of magnitude proportional to the alternating current voltage drop across said article; and means to derive from the flow of said direct current an electrical signal proportional to said alternating current voltage drop.

10. Apparatus as described in claim 9, said last mentioned means including a resistor through which the direct current passed by said rectifier must flow, and a smoothing condenser shunted across said resistor.

11. Apparatus as described in claim 10, including a second rectifier connected in inverse relation to said first rectifier and arranged to discharge said direct current blocking capacitor to ground during alternate half cycles of the alternating current voltage being measured.

12. Apparatus as described in claim 11, said means for measuring the direct current voltage drop across said article terminating in a thyratron relay which is arranged to fire if the high resistance limit is exceeded, said means for measuring the alternating current voltage drop across said article also terminating in a thyratron relay which is arranged to fire unless the low resistance limit is exceeded; and common current supply means for both of said thyratron relays including as an element the actuating coil of said mechanical relay means.

ROBERT B. HARTMAN.

REFERENCES CITED

The following references are of record in the file of this patent:

UNITED STATES PATENTS

| Number | Name | Date |
| --- | --- | --- |
| 1,555,266 | Chubb | Sept. 29, 1925 |
| 1,874,142 | Tingley | Aug. 30, 1932 |

OTHER REFERENCES

Article entitled "Measuring a Choke on Load" by Shiepe in Radio World for December 1936, pages 12 and 13.